United States Patent
Janssen et al.

(10) Patent No.: US 12,075,770 B2
(45) Date of Patent: Sep. 3, 2024

(54) CAMERA BASED PEST MANAGEMENT SPRAYER

(71) Applicant: BASF Agro Trademarks GmbH, Ludwigshafen am Rein (DE)

(72) Inventors: Ole Janssen, Cologne (DE); Bjoern Kiepe, Cologne (DE); Mirwaes Wahabzada, Langenfeld (DE); Andreas Johnen, Münster (DE)

(73) Assignee: BASF Agro Trademarks GmbH, Ludwigshafen Am Rhein (DE)

( * ) Notice: Subject to any disclaimer, the term of this patent is extended or adjusted under 35 U.S.C. 154(b) by 538 days.

(21) Appl. No.: 17/598,273

(22) PCT Filed: Mar. 25, 2020

(86) PCT No.: PCT/EP2020/058438
§ 371 (c)(1),
(2) Date: Sep. 26, 2021

(87) PCT Pub. No.: WO2020/193666
PCT Pub. Date: Oct. 1, 2020

(65) Prior Publication Data
US 2022/0183266 A1   Jun. 16, 2022

(30) Foreign Application Priority Data
Mar. 26, 2019   (EP) .................................. 19165176

(51) Int. Cl.
*A01M 7/00*   (2006.01)
*G06T 7/00*   (2017.01)

(52) U.S. Cl.
CPC ......... *A01M 7/0089* (2013.01); *G06T 7/0014* (2013.01); *A01M 2200/01* (2013.01)

(58) Field of Classification Search
None
See application file for complete search history.

(56) References Cited

U.S. PATENT DOCUMENTS

| | | | |
|---|---|---|---|
| 9,852,362 B2 | 12/2017 | Fryshman | |
| 10,939,607 B2 | 3/2021 | Hoffmann | |
| 2013/0289052 A1* | 10/2013 | Sakamoto | A01N 43/90 544/278 |
| 2021/0329906 A1* | 10/2021 | Taarnhøj | A01M 7/0042 |

(Continued)

FOREIGN PATENT DOCUMENTS

| | | |
|---|---|---|
| CN | 106956778 A | 7/2017 |
| CN | 108132655 A | 6/2018 |

(Continued)

OTHER PUBLICATIONS

Zhong, et al., "A Vision-Based Counting and Recognition System for Flying Insects in Intelligent Agriculture", Sensors, 18, 1489, 2018, 19 pgs.

(Continued)

*Primary Examiner* — Gabriel I Garcia
(74) *Attorney, Agent, or Firm* — Lowenstein Sandler LLP

(57) ABSTRACT

Method for pest treatment of a plantation field, controlling device for controlling a pest treatment of a plantation field and a treatment device having said controlling device, wherein the treatment considers a pest insect population and a beneficial insect population.

16 Claims, 6 Drawing Sheets

(56) References Cited

U.S. PATENT DOCUMENTS

2022/0053122 A1\* 2/2022 Scheiner ................. A01G 7/00
2022/0167606 A1\* 6/2022 Janssen ............... A01M 7/0089

FOREIGN PATENT DOCUMENTS

| CN | 109077047 A | 12/2018 |
| JP | 2012161269 A | 8/2012 |
| KR | 20100127476 A | 12/2010 |

OTHER PUBLICATIONS

International Search Report and Written Opinion for PCT/EP2020/058438 mailed Jun. 22, 2020, 11 pgs.

\* cited by examiner

CAMERA BASED PEST MANAGEMENT SPRAYER

CROSS-REFERENCE TO RELATED APPLICATION(S)

This application is a national stage entry under 35 U.S.C. § 371 of International Application No. PCT/EP2020/058438, filed on Mar. 25, 2020, which claims the benefit of priority of European Patent Application No. 19165176.9, filed on Mar. 26, 2019, the disclosures of which are hereby incorporated by reference herein in their entireties.

FIELD OF THE INVENTION

The present invention relates to a method and a device for pest treatment of a plantation field having an improved efficiency and a sustainability with respect to beneficial population.

BACKGROUND OF THE INVENTION

Presently, a common approach for treatment of plantations with respect to pest population is a uniform application of a pesticide, which is for example uniformly sprayed onto a plantation over an entire field. The farmer may have a view on the plantation of the field and may evaluate upon inspection of singular plantation spots which pesticide is to be applied and which dosage of pesticide may be considered as reasonable. However, the pest management gets increasingly under pressure, as side effects of insecticides or pesticides may be heavy and may reduce biodiversity in a field to a degree which is not acceptable. If reducing the amount of insecticides or pesticides, in turn yield losses may be heavy, if pest management is not done properly, which may lead to a productivity loss. Farmers see this effect in oilseed rape or potato plantation. Further, reducing the pesticides and insecticides in the field provides a better protection of beneficial insects. However, it is difficult to find the proper dosage for a pesticide or insecticide. Some pest targets are easy to see on plants but farmers cannot consider all field areas probably having a different situation with respect to the population of pest insects.

Some treatments, e.g. pollen beetle in canola or potato beetle in potatoes, are driven by thresholds based on a number of insects/pests individuals have seen. Nowadays, farmers make these decisions on a field level, however not on a zone level although pest densities may vary sometimes heavily across a field.

The present invention seeks to overcome this deficiency.

SUMMARY OF THE INVENTION

The present invention provides a method for pest treatment of a plantation field, a controlling device for pest treatment and a treatment device for pest treatment of a plantation field according to the independent claims, whereas further embodiments are incorporated in the dependent claims.

According to a first aspect there is provided a method for pest treatment of a plantation field, wherein the method comprises taking an image of a predetermined range of a plantation of the plantation field, recognizing items on the taken image of the predetermined range, identifying one or a plurality of patterns of an insect population based on the recognized items and a database having stored samples of an insect population, determining a measure of a quantity of insect population based on the identified patterns, controlling a treatment arrangement of a treatment device based on the determined quantity of an insect population, wherein controlling of a treatment arrangement includes activating a treatment unit if a quantity of a first type and/or a second type of pest insects extends a predetermined threshold, and blocking a treatment unit from being activated if a quantity of a particular type of beneficial insects extends a predetermined threshold.

Thus, the method may provide an automated decision on whether or not a treatment unit is to be activated or not, based on the recognized and identified insect population, considering the population of pest insects as well as the population of beneficial insects. With this respect, the method includes taking an image from the predetermined range of a plantation of a plantation field, which image may be taken from an image capturing device like for example a camera. It should be noted that image capturing not only includes taking a static picture allowing a spatial resolved detection, but may also include time resolved imaging, e.g. a video sequence or a laser scanning of the plantation, which may allow a time resolved imaging. Image capturing may be sensitive to visible light as well as infrared light. Image capturing may also include optical detection of particular parameters, as motion pattern and frequencies. Images can also be acquired by a for example, a UAV (unmanned aerial vehicle) which can fly around a plantation field or a robotic land vehicle that moves around the plantation field and acquires the imagery. This image is provided, so that the method can be carried out based on the provided image. With this respect, it should be understood that taking an image does not mandatorily include the actual operation of a camera but may also mean taking an already generated image via for example a data input interface for image data. The method then recognizes items on the provided image and uses the recognized items to identify patterns of an insect population. The identification may take place based on the recognized items as well as stored samples of an insect population in a database. The stored samples in a database may be for example patterns which can be compared to the recognized items so as to conclude from the database an insect population. Based thereon, the method includes determining a measure of quantity of insect population based on the identified patterns. It should be noted, that the determination may also consider additional information, like for example statistical data which provide a rate or percentage, how many insects statistically are on the top of a leaf or a bottom of a leaf, so that from this ratio it can be concluded how many insects in total are on the leaf, even if the image only depicts e.g. the top of the leaf. After determining a measure of a quantity of insect population, be it pest insect population or beneficial insect population, a treatment arrangement of a treatment device can be controlled based on the determined quantity of insect population. It should be noted, that controlling a treatment arrangement does not mandatorily mean an immediate activation of for example a nozzle of a treatment device, but may also constitute providing a signal or an instruction to a remote treatment arrangement or treatment device, so that the treatment arrangement or treatment device on site can carry out the activation or deactivation of a e.g. nozzle of a sprayer based thereon, even if the recognizing, identification, determination and controlling is carried at a remote site. With this respect, it should be understood, that the method as outlined above can be carried out on a remote controlling device, which does not have to be provided on the treatment device on the field. In particular, the method can be carried out on a service provider side, which receives for example an image taken by a camera on the field and being submitted to the remote service provider, wherein the service provider carries out the method and provides a signal or instruction, which is sent to the remote treatment device on the field to carry out an activation or deactivation of a treatment arrangement like for example a nozzle arrangement. According to the method, the controlling of the treatment arrangement includes activating a treatment unit, for example a nozzle, if a quantity of a first type, e.g. a pollen beetle, and/or a second type, e.g. a potato beetle, of pest insects extends a predetermined threshold. It should be understood, that there may be separate and different predetermined thresholds for different types of pest insects. If it is determined that the predetermined threshold is exceeded, the method decides to activate a treatment arrangement of a treatment device, for example a nozzle. However, this activation should only take place, if no beneficial insects are effected. Consequently, the activation as described above only takes place if no or only a low number of beneficial insects are detected, otherwise the method blocks the activation of a treatment arrangement. Thus, it can be achieved that a pest treatment only takes place if it is not expected that beneficial insects are hurt. It should also be noted that the activation rate (percentage) can be related to a quantity of insects.

According to an embodiment of the invention, controlling of a treatment arrangement is conducted based on a look-up table having stored a relation of quantity of pest insect population and a quantity of beneficial insect population on the one hand and a respective quantitative activation grade for a treatment unit on the other hand the treatment unit being allocated to a respective relation.

Thus, the activation and deactivation is not only a digital switch on/switch off activation, but may also include a particular activation grade depending on a quantity of pest insects population and a quantity of beneficial insect population. In general, the quantitative activation grade of a treatment unit, like for example a nozzle, is higher when a quantity of pest insects detected is high, and is decreased upon an increasing quantity of beneficial insect population. In case no beneficial insects are identified, the detected amount of pest insects may directly be related to the quantitative activation grade for a treatment unit. However, the quantitative activation grade may be significantly reduced upon only a very low number of detected beneficial insects, as the yield of beneficial insects may be much higher than the deterioration by pest insects. With this respect, the look-up table may include a plurality of combinations of a quantity of pest insects and a quantity of beneficial insects and a corresponding quantitative activation grade of a treatment device or unit. It should be noted, that such a look-up table may be a numerical look-up table having discrete values and relations stored thereon, but may also be a particular algorithm, which may include the parameters of a pest insect population (of different types), a beneficial insect population (of different types) and an activation grade.

According to an embodiment of the invention, recognizing items on a taken image is conducted based on a spectral detection of at least one pixel, in particular a Red-Green-Near InfraRed RGNIR detection, wherein a pattern is based on a location of the at least one detected pixel in an RGNIR color space.

Thus, the particular properties of pest insects and beneficial insects with respect to a particular color spectrum may be used for identification of the particular type of insect. If for example in a particular color space like the RGNIR color space, a particular type of insect, be it pest insect or beneficial insect, has a unique spectral pattern, this makes it possible to clearly identify such an insect over for example the remaining plantation or soil which is also provided on the taken image. The spectral analysis may be carried out based on camera based imaging, wherein the images may carry color and/or spectral information of the imaged items.

According to an embodiment of the invention, identifying one or a plurality of patterns of an insect population is based on an algorithm fed by or based on stored samples of an insect population (of a particular type) of the database.

Thus, the identification of the insect population, being pest insects or beneficial insects, may underlie a particular algorithm which may be based on the samples of the insect populations which are stored in the database. This may lead to a system which has a self-learning property, so that the identification may improve over the time after having applied the method for several seasons.

According to an embodiment of the invention, an identified pattern of an insect population is stored as a sample of an insect population in the database.

Thus, it is possible to take identified patterns of insect population, be it pest insect population or beneficial insect population, to update or extend the database. This procedure can be considered as a self-learning procedure of the database, so that the database encompasses an increasing number of pattern samples which may serve for the identification process as outlined above. The pattern analysis may be carried out based on camera based imaging, wherein the images may carry shape information of the imaged items, in particular of the pest insects or pest insect population. The pattern analysis may also be carried out based on a laser scan process, wherein the laser scanned patterns may carry shape information of the imaged items, in particular of the pest insects or pest insect population.

According to an embodiment of the invention, recognizing items is conducted on a plurality of predetermined ranges simultaneously, wherein identifying one or a plurality of patterns of an insect population is conducted on the plurality of predetermined ranges, respectively, wherein determining a measure of a quantity of insect population is conducted on the plurality of predetermined ranges, respectively, wherein controlling a treatment arrangement of a treatment device is conducted for one or a plurality of treatment units being allocated to a respective one of the plurality of predetermined ranges.

Thus, the resolution of a field is not limited to the track width of a treatment device, e.g. the length of a boom of a sprayer device, but can be improved by dividing the track width of a treatment device into sub-tracks. A track of a treatment device is to be understood as a width of a line for which a treatment device can treat the plantation at the same time. It should be noted, that the size of the ranges can be reduced down to the size of a treatment spot which is treated by a single nozzle of a treatment device. In this case, the method can be conducted on each of the predetermined ranges or treatment spots separately. It should be noted, that even if the method for more than one predetermined range bases on a single image, also a larger image can be divided into the respective ranges which serve as a base for recognizing and identifying.

According to an embodiment of the invention, recognizing items on the image includes at least one of a recognition of a shape, wing beat frequency and a spectral signature of a particular type of insect, in particular a spectral signature in an RGNIR color space.

Thus, not only the pattern of the insect population can be considered for recognition and identification, but also the shape of a single insect, a shape of a particular pattern of the insect, in particular the shape of a pattern on the back side of the insect, or a particular pattern of an insect population. As an alternative or in addition, the wing beat frequency of an insect can be detected, determined and used for identification of a particular type of insect. The wing beat frequency can be detected by e.g. laser scanning of the plantation and evaluation the frequency spectrum detected. Particular characteristics in the spectrum can be indicative of particular types of insects. As alternative or in addition, also a particular optical spectral signature of an insect may be used for identification, which may be unique for a particular type of insect. It should be noted, that the optical spectral signature may allow to distinguish types of insects, which may have a similar shape or a similar population pattern, although the insects are different and may require different measures, e.g. different pesticides or insecticides. This also applies for the wing beat spectrum analysis. When using the optical or wing beat frequency spectral signature, it is possible to apply a more tailored application of pesticides or insecticides. With this respect, an optical spectral signature in the Red-Green-Near InfraRed RGNIR color space may represent a better distinction than a spectral signature in a Red-Green-Blue RGB color space, as insects and plantations often do not have a blue color contribution. The motion of the pest insects as well as the beneficial insects may be carried out based on a laser scan process, wherein the laser scanned motion may carry a characteristic motion of the scanned items, in particular of the pest insects, the pest insect population, the beneficial insects and/or the beneficial insect population.

According to an embodiment of the invention, the stored samples represent a single pest insect or an agglomeration of a plurality of pest insects, in particular a single or an agglomeration of a plurality of potato beetles, a single or an agglomeration of a plurality of pollen beetles or a combination thereof, and/or the stored samples represent a single beneficial insect or an agglomeration of a plurality of beneficial insects, in particular a single or an agglomeration of a plurality of bees.

Thus, the stored samples in the database may represent a large number of different insects, be it pest insects or beneficial insects. It should be noted, that the insects are not limited to the potato beetles, pollen beetles or bees, but may also be additional type of insects or even variations of the above-mentioned types of insects which may require a different treatment. The stored samples may include a shape information, including a shape of a body of that particular insect or a shape of a population of that particular insect, a characteristic wing beat frequency or frequency spectrum of that particular insect, and/or a characteristic optical spectrum of that particular insect or insect population.

According to an embodiment of the invention, the stored samples represent a combination of a single or an agglomeration of a plurality of pest insects, in particular a single or an agglomeration of a plurality of potato beetles and/or a single or an agglomeration of a plurality of pollen beetles on the one hand and a single or an agglomeration of a plurality of beneficial insects, in particular a single or an agglomeration of a plurality of bees on the other hand.

Thus, not only the shape, a population pattern or an optical or wing beat frequency spectral signature of a single type of insect may be stored as a pattern or sample in the database, but also a combination thereof, so that also an agglomeration of different types of insects may be recognized and identified by the method.

According to an embodiment of the invention, determining a measure of a quantity of insect population includes determining at least one of a quantity of a particular first type of pest insects, in particular potato beetles, a quantity of a particular second type of pest insects, in particular pollen beetles, and/or a quantity of a particular type of beneficial insects, in particular bees.

Thus, it is possible to determine even from an agglomeration of different types of insects, be it pest insects or beneficial insects, a respective quantity of insect population. It should be noted, that different types of insects may have a different ratios of visible and invisible population, which means the relation between the insects on the top of the leaf and the bottom of the leaf, and that these different ratios may be considered for determining the true quantity of insect population from the provided image.

According to an embodiment of the invention, determining includes online determination of a measure of a quantity of insect population based on the identified patterns, wherein in particular during field passage images and/or scans are captured, information is collected and a localized application according to the imaged and/or scanned item is carried out; wherein image capture and/or scan capture is timed such that it correlates with the speed during passage.

Thus, the treatment of the plantation can be carried out in real time based on the in situ captured information of that respective plantation.

According to a second aspect of the invention, there is provided a controlling device for a treatment device, in particular for a smart sprayer for pest treatment of a plantation field comprising an image interface, a treatment control interface, a database interface, an image recognition unit being adapted for recognizing items on an image received from the image interface, an identification unit being adapted for identifying one or a plurality of patterns of an insect population based on the output of the image recognition unit and samples of an insect population being received from a database having stored samples of a pest population and/or beneficial insect population via the database interface, a determination unit being adapted for determining a measure of a plurality of insect population based on the identified patterns, and a controlling unit being adapted for generating a controlling signal for a treatment arrangement of a treatment device based on the determined measure of a quantity of insect population and for outputting the controlling signal to the treatment control interface, wherein the controlling unit being adapted for generating an activating signal for a treatment unit if a quantity of a first type and/or a second type of pest insect extends a predetermined threshold, and generating a blocking signal for deactivating a treatment unit if a quantity of a particular type of beneficial insect extends a predetermined threshold.

For the controlling device the same explanations apply as for the method as outlined above. It should be noted, that in particular the activating signal and a blocking signal do not prejudice a particular signaling pattern, but may be understood as a functional signaling. With this respect, the controlling unit may output either an activating signal or a blocking signal depending on whether the pest insect threshold is exceeded or a beneficial insect threshold is exceeded or not. Insofar, the activating signal and the blocking signal have to be understood as a logic signaling and the respective quantity of pest insects and beneficial insects as a base for an activation or deactivation of a treatment unit like for example a respective nozzle. The controlling device may refer to a data processing element such as a microprocessor, microcontroller, field programmable gate array (FPGA), central processing unit (CPU), digital signal processor (DSP) capable of receiving field data, e.g. via a universal service bus (USB), a physical cable, Bluetooth, or another form of data connection. The controlling device may be provided for each treatment device. Alternatively, the controlling device may be a central controlling device, e.g. a personal computer (PC), for controlling multiple treatment devices in the field, and may also be implemented on a remotely located server.

According to an embodiment of the invention, the image recognition unit is adapted for conducting an item recognition on a plurality of predetermined ranges simultaneously, wherein the identification unit is adapted for identifying one or a plurality of patterns of an insect population on the plurality of predetermined ranges, respectively, wherein the determination unit is adapted for determining a measure of a quantity of insect population on the plurality of predetermined ranges, respectively, wherein the controlling unit is adapted for controlling a treatment arrangement of a treatment device for one or a plurality of treatment units being allocated to a respective one of the plurality of predetermined ranges.

Thus, the controlling device is capable of controlling the application of an insecticide or pesticide based on a plurality of predetermined ranges. This allows to increase the resolution of areas of different treatment in a field being lower than the track width of a treatment device like a sprayer and its respective boom length.

According to third aspect of the invention there is provided a treatment device for pest treatment of a plantation field comprising an image capture device being adapted for taking an image from a predetermined range of a plantation of a plantation field, a treatment arrangement having one or a plurality of treatment units, an image interface being adapted for providing an image captured by the image capture device to a controlling device as described above, a treatment control interface being adapted for receiving a treatment control signal from a controlling device as described above, wherein the image interface of the treatment device is connectable to an image interface of a controlling device as described above, wherein the treatment control device of the treatment device is connectable to a treatment control interface of a controlling device as described above, wherein the treatment device is adapted to activate respective ones of treatment units of the treatment arrangement based on a signal received from a controlling device as described above via the treatment control interface of the treatment device.

Thus, a treatment device is provided which allows to treat a field. Although the method can be conducted remotely from a treatment device, and a controlling device as described above can be located remote from a treatment device, a controlling device can also be provided on site of a treatment device, so that the complete intelligence may be allocated to the treatment device on the field. It should be noted, that even if the controlling device is allocated to the treatment device on the field, image capturing can be for example provided by a remote device, like for example an unmanned aerial vehicle or a satellite having a sufficient resolution, as well as the database may be provided remotely and may be centralized for a plurality of controlling devices, which may be reasonable for large amounts of data and a data updating procedure, which is much more easier if not carried out on a treatment device on the field.

It should be noted, that an image capture device, although being remote from the treatment device, may be allocated to the treatment device, which may be for example an unmanned aerial vehicle which is wirelessly connected to the treatment device. It should be noted, that even if one image is captured, this image can be divided into sub-images for treatment of predetermined sub-ranges as described above.

According to an embodiment of the invention, the image capture device comprises one or a plurality of cameras, in particular on a boom of a treatment device, wherein the image recognition unit is adapted for recognizing insects and/or a plantation using red-green-blue RGB data and/or near infrared NRI data and/or RGNIR data. Thus, image recognition can be carried out on suitable color rooms which may be selected according to the objects to be recognized, in particular plantation or insects. It should be noted, that depending on the type of plantation or the type of expected insects, also different color rooms can be selected or can be adapted or even can be combined, if necessary.

According to an embodiment of the invention, the treatment device further comprises a controlling device as described above, wherein the treatment device is designed as a smart sprayer, wherein a particular treatment arrangement e.g. is a nozzle arrangement, wherein the treatment unit or units are e.g. a nozzle or nozzles.

It should be noted, that different embodiments as described above can be combined and can also lead to a synergetic effect extending over the effect of the separate embodiments as described above without departing from the invention. Further exemplary embodiments and examples are described with respect to the enclosed figures which will be described in the following.

BRIEF DESCRIPTION OF THE FIGURES

In the following, it is referred to the following figures to explain exemplary embodiments.

DETAILED DESCRIPTION OF EXEMPLARY EMBODIMENTS

Figure 1:
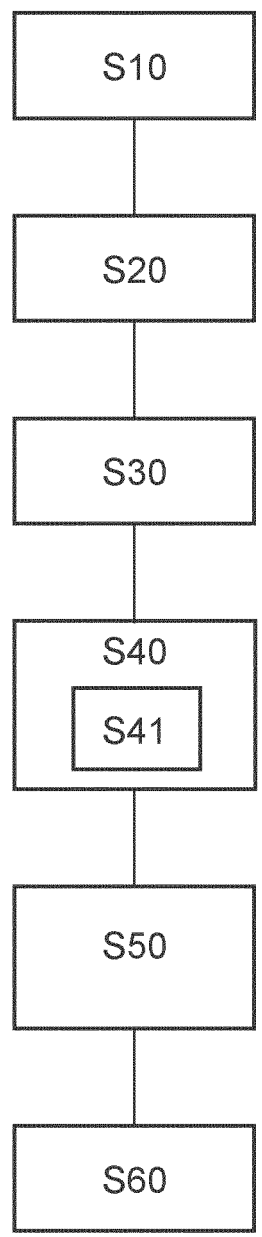
FIG. 1 illustrates a schematic overview on the method according to an exemplary embodiment.

FIG. 1 illustrates an exemplary embodiment of a method. According to FIG. 1, the method comprises the steps of taking an image S10, recognizing items on that image S20, identifying patterns based on the items S30, determining a measure of a quantity of insect population based thereon S40, determining a quantity of a particular type of pest insects or a type of beneficial insects S41, controlling a treatment arrangement S50 as well as activating or deactivating a treatment unit S60.

Taking an image which can be used by the method can be conducted by several imaging capturing devices, for example a satellite, an unmanned aerial vehicle, a manned aerial vehicle or a camera being mounted on a field driving device. The image or even a plurality of images which may be merged to a single image or portions of an image may serve as basis for the method for pest treatment. The image will be provided in form of an image, image data or the like and may serve for the method as basis for recognizing items on the image or in the image data. The image can be evaluated with respect to a predetermined field range, wherein this portion of the image of the predetermined field range refers to a particular portion of a field and depicts a plantation, insects on the plantation, the soil, insects on the soil or other structures. The recognized items being recognized in S20 will serve as a basis for identifying S30 one or a plurality of patterns of an insect population. The insect population may be a pest insect population or a beneficial insect population. Identifying S30 will use the identified patterns and a database having stored samples of an insect population for determining S40 a measure of a quantity of insect population. Determining a measure of an insect population S40 may include determining a quantity of a particular type of insects, in particular a particular type of pest insects S41. It should be noted, that determining a measure of a quantity of insect population may also consider particular statistic data, for example a ratio between an amount of insects on the top of a leaf and a statistical amount of a number of insects on the bottom of a leaf, so that from an image of a top of a leaf it can be concluded the total quantity of insect population. It should be noted, that such background data are not limited to such ratios and may include other empirical data which may serve for determining a measure of a quantity of insect population. Based on the determined quantity of insect population, be it specified according to a particular type of insect of pest insects in total or a particular type of beneficial insect or beneficial insects in total or a combination thereof, the treatment arrangement is controlled S50. Controlling means that a particular signal is provided which may activate or deactivate a treatment unit. It should be understood, that in particular the actual activation or deactivation of a treatment unit as such is not mandatorily part of the method, as the method may be conducted remote from a field, for example by a service provider. If the method is conducted at the service provider's side, a signal may be provided as a signal for controlling a treatment arrangement, wherein this signal may be interpreted by a treatment arrangement so as to control individual treatment units, like for example nozzles of a sprayer device.

Figure 2:
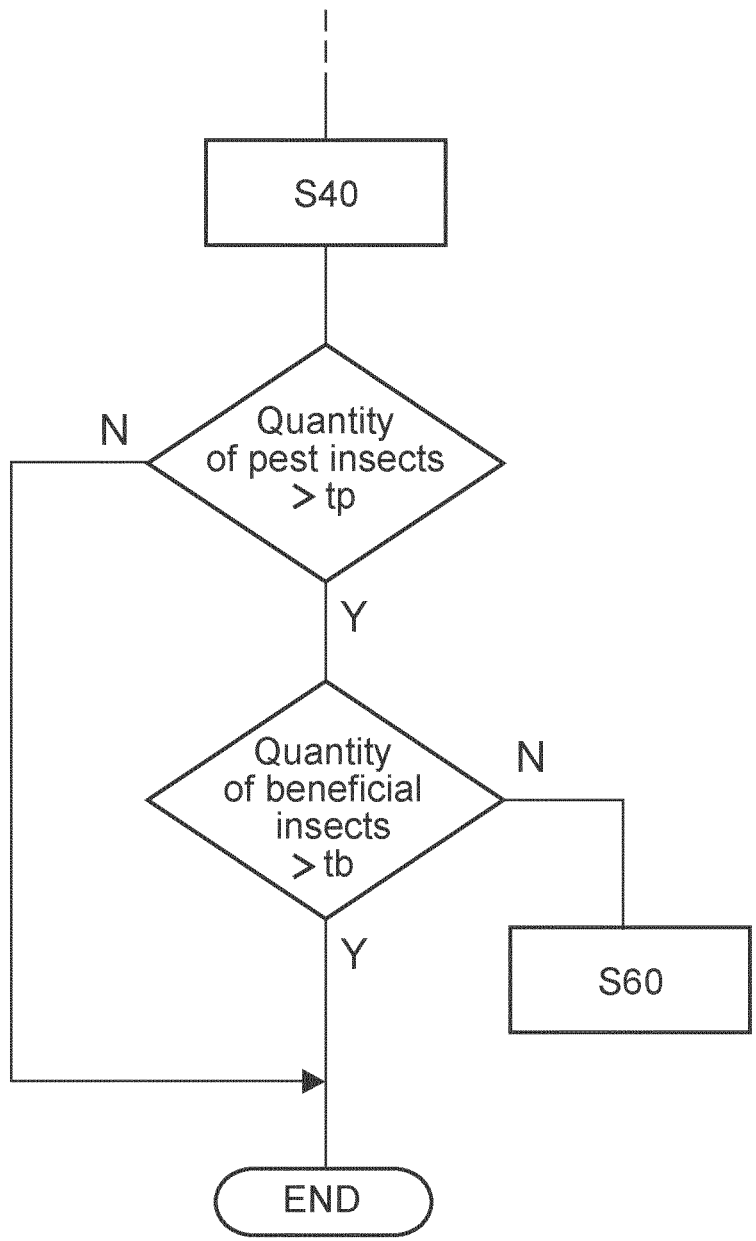
FIG. 2 illustrates a schematic decision tree for the treatment according to an exemplary embodiment.

FIG. 2 illustrates the decision making based on which an activation of a treatment unit takes place or not. After determining a measure of a quantity of insect population, in particular a quantity of pest insect population and a quantity of beneficial insect population, it is determined whether the quantity of pest insects is above a certain threshold tp. If the quantity of a pest insect population is below the threshold tp, no activation of a treatment unit takes place. In this particular loop, the method comes to an end. However, if the quantity of pest insects is above a certain threshold tp, a quantity of beneficial insects is considered. If the quantity of beneficial insects is above a certain threshold tb, it is determined that it is not desired to apply insecticide or pesticide in order to protect the beneficial insects. In this case, the method in this loop comes to an end. However, if the quantity of beneficial insects is below a certain threshold tb, activation of the treatment unit S60 takes place. It should be noted, that the threshold tp and the threshold tb may be thresholds which have a certain dependency on each other. This means, that a threshold of tp is higher in case the threshold of tb is higher. With this respect, a look-up table may be provided which takes into account the different levels of tp and tb and based on that a particular grade of activation. This means, that even the activation is not a digital activation of on/off, but may be a particular grade of activation, for example 10%, 30% or 70% depending on the determined quantity of pest insects and the quantity of beneficial insects. Further, it should be noted that the method is repeated for a subsequent range of plantation. The method can also applied a couple of times for one range of plantation, so as to eliminated statistical deviations.

Figure 3:
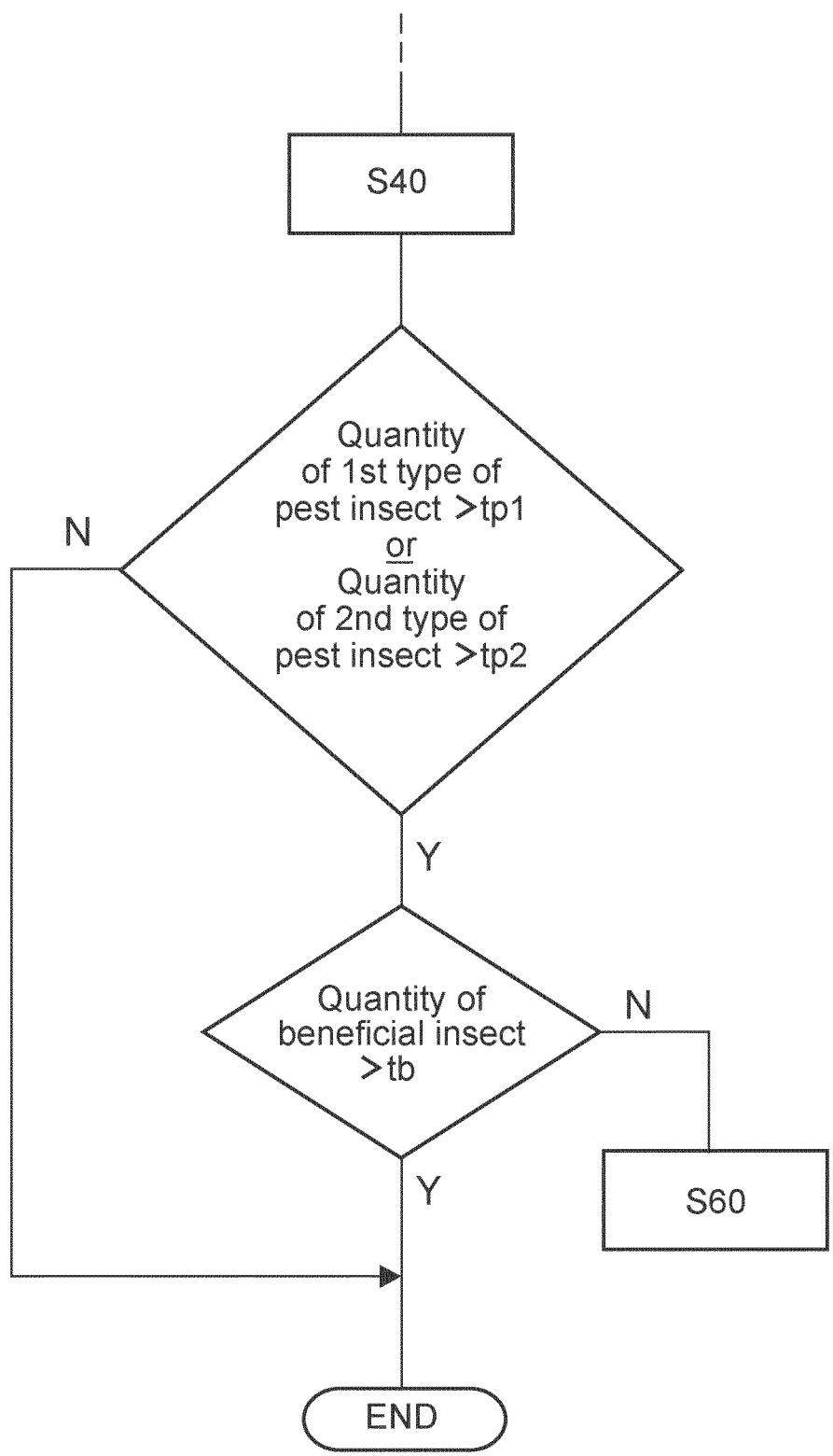
FIG. 3 illustrates an exemplary decision tree according to another embodiment.

FIG. 3 illustrates a further embodiment of a determination which considers two different types of pest insects. It should be considered, that the decision illustrated in FIG. 3 is not limited to only two types of insects but may be adapted accordingly to distinguish between more than two types of pest insects and even more than one type of beneficial insects and will be adapted accordingly by a skilled person. After determining the measure of a quantity of insect population, which includes a quantity of insect population of a first type of pest insects, a second type of pest insects and a quantity of beneficial insects for the purposes of FIG. 3, it is determined whether a quantity of a first type of pest insects is above a certain threshold tp1 or a quantity of a second type of pest insects is above a certain threshold tp2. If the answer to this question is NO, the method comes to an end for this loop. However, if either of the thresholds tp1 or tp2 is exceeded, a quantity of beneficial insects will be considered, and if the quantity of beneficial insects is above a certain threshold tb, the method comes to an end. However, if the quantity of a beneficial insect is below a threshold tb, an activation of the treatment arrangement will take place. It should be noted, that FIG. 2 and FIG. 3 are illustrations of a decision based on a Yes/No decision, however, the several thresholds tp1, tp2 and tb may also be represented by an algorithm which expresses the grade of activation in step S50 or S60. Although in FIG. 2 and FIG. 3 the activation of a treatment unit S60 is illustrated, it should be understood, that FIGS. 2 and 3 can also lead to an output of an instruction or a signal for controlling a treatment arrangement at a remote side, so that the instruction or activation/deactivation signal or an activation grade signal may be interpreted by a treatment arrangement to activate/deactivate a treatment unit like a nozzle.

Figure 4:
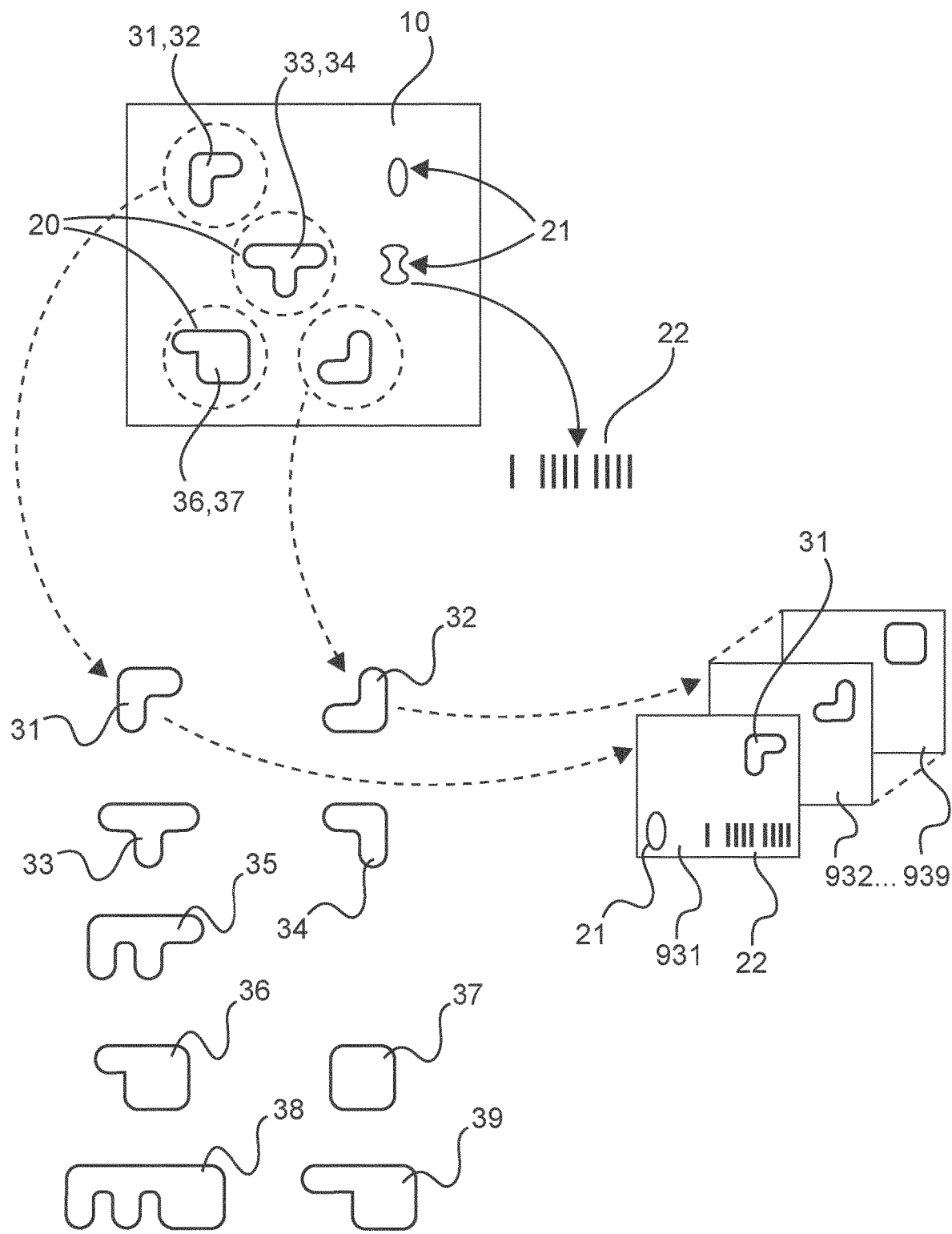
FIG. 4 illustrates an image, items thereon and patterns according to an exemplary embodiment.

FIG. 4 illustrates the procedure of recognizing items 20 on an image 10. An image 10 which may be provided for applying the method and which may be used by a controlling device (which will be described in the following) includes particular items 20. Based on the recognized items 20, one or a plurality of patterns 31, 32, . . . , 39 are identified whereas samples stored in a database 90 (not illustrated here) may serve as a basis for this identification. The recognized items 20 on the image 10 may include a shape 21 of a particular type of insect or may be a spectral signature 22 of a particular type of insect. Both, the shape 21 as well as the spectral signature may be used for identification of a particular type of insect, be it a pest insect or a beneficial insect. Spectral signature may include an optical spectrum as well as a frequency spectrum of a wing beat frequency. For this purpose, a database may provide samples 931, 932, . . . , 939, which provide a correlation between a particular pattern of a first type of pest insect 31, a particular shape 21, a spectral signature 22 and further additional information which are consolidated in for example sample 931. The stored samples may include a shape information, including a shape of a body of that particular insect or a shape of a population of that particular insect, a characteristic wing beat frequency or frequency spectrum of that particular insect, and/or a characteristic optical spectrum of that particular insect or insect population. The same applies for the other samples stored in the database. Based on the items, the patterns 31, 32, . . . , 39 are identified and will be used for identifying a particular type of insect as well as a quantity of insect population based on the samples 931, 932, . . . , 939 of the database. Thus, based on the recognized items on the image, a quantity of a particular type of insect may be determined, so that based on the determined quantity of insect population controlling of a treatment arrangement may take place. A sample may represent a single insect of a particular type, but may also represent a population, i.e. a plurality of insects of a particular type or an agglomeration of different types of insects.

Figure 5:
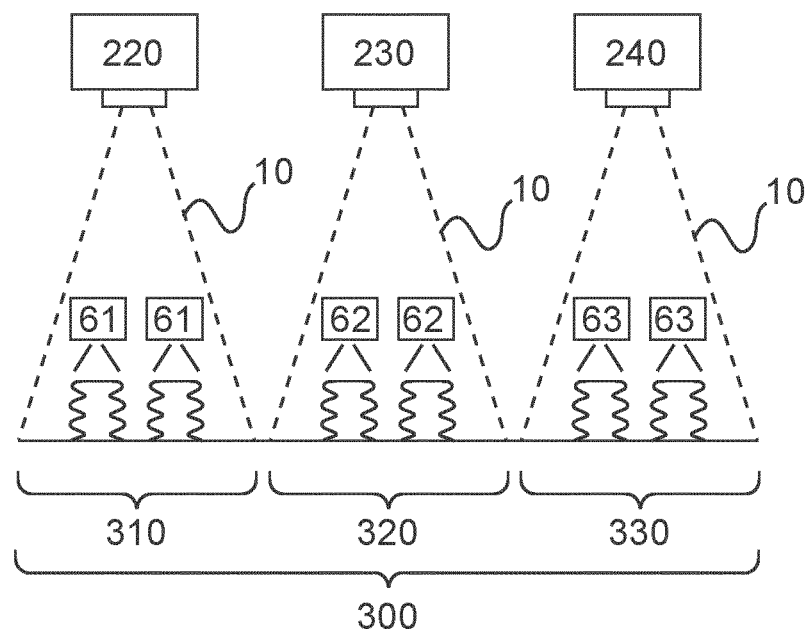
FIG. 5 illustrates a schematic overview on the situation on a field or crop canopy according to an exemplary embodiment.

FIG. 5 illustrates a general setup of the field situation. A plantation field or a crop canopy 300 may be considered as an agglomeration of a plurality of predetermined ranges of a plantation field 310, 320, 330. Taking an image or at least recognizing and identifying may take place based on a predetermined range of a plantation field 310, 320, 330. It may be understood, that the image taken by an image capture device 220, 230, 240 may also be a large image of the entire plantation field 300 or larger portions of a plantation field 300 and may be divided in sub-images which then may serve for the recognizing and identifying process. For illustration purposes, in FIG. 5, a particular image capture device 220, 230, 240 is allocated to a particular predetermined range of a plantation field 310, 320, 330. In the embodiment illustrated in FIG. 5, each of the image capturing devices takes an image which is used for the recognizing and identification process. Based on the recognizing and identification as well as the determination S20, S30, S40, treatment units 61, 62, 63 as part of a treatment arrangement 60 are activated or deactivated based on the determination of the quantity of the particular type of insects. It should be noted, that as the smallest treatment spot, a spot may be considered which may be covered by a single treatment unit 61, 62, 63, which may be a nozzle of a sprayer. Nevertheless, also a plurality of treatment units 61 may be allocated to a particular predetermined range of plantation field 310, as illustrated in FIG. 5. It should be noted that the image capturing and/or scanning may take place down to a plant or even leaf level, which means that the situation on a particular plant or even leaf can be detected. The same applies to the treatment, so that the number and density of nozzles can be in a way to treat a single plant or even a leaf. For this purpose, the nozzles may be moved and inclined, and even may be arranged on a robot arm to focus on a particular plant or even leaf. It should be noted that the image capturing devices may be cameras or laser scanners. The image capturing devices may be adapted to not only take spatial resolved images, but also time resolved images, e.g. video sequences. Image capturing devices may also be adapted to optically detect time resolved parameters of particular insects, as e.g. a motion pattern and frequencies. As an alternative or in addition, the wing beat frequency of an insect can be detected and used for identification of a particular type of insect. The wing beat frequency can be detected by e.g. laser scanning of the plantation and evaluation the frequency spectrum detected. Particular characteristics in the spectrum can be indicative of particular types of insects.

Figure 6:
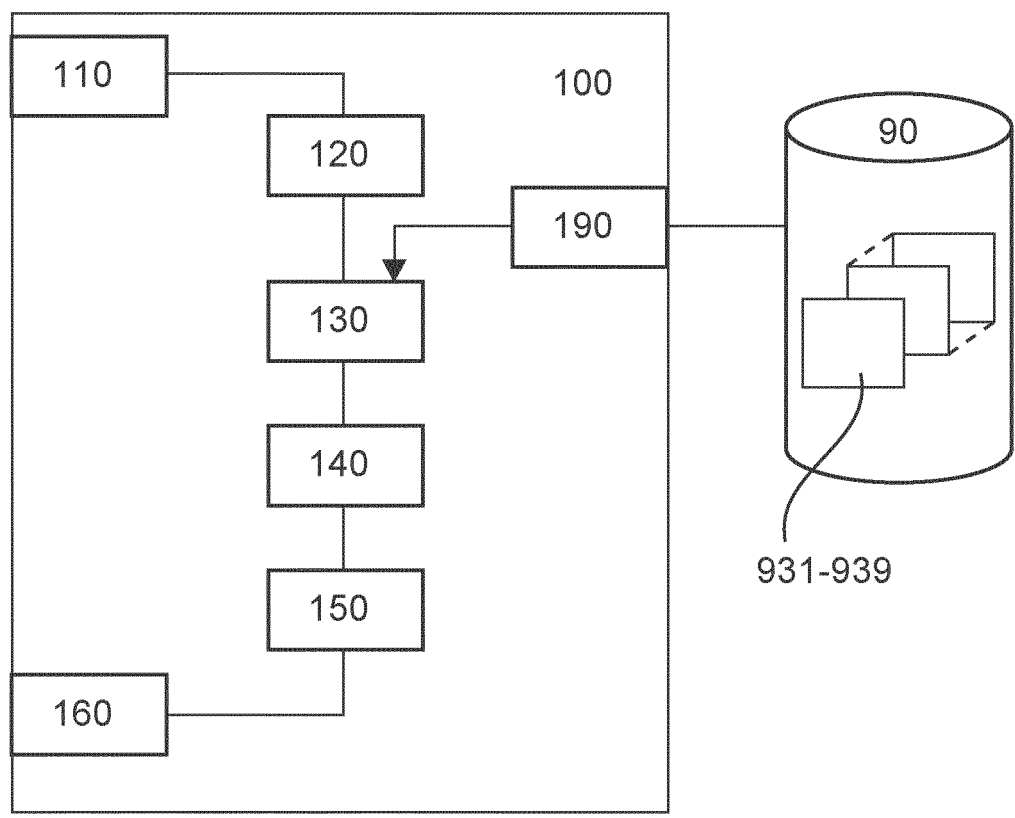
FIG. 6 illustrates a controlling device according to an exemplary embodiment of the invention.

FIG. 6 illustrates a controlling device 100 having an image interface 110 and a treatment control interface 160. The image interface 110 serves for receiving an image which is captured by an image capturing device as described with respect to FIG. 5. This image or image data is provided to the image recognition unit 120 for recognizing items 20 on the respective image. An identification unit 130 serves for identifying one or a plurality of patterns based on the recognized items of the image recognition unit 120 and patterns 931 to 939 of a database 90, which will be provided to the controlling device 100 via the database interface 190. The identified patterns will be used for determining a measure of a quantity of insect population in the determination unit 140 which then will serve for controlling a treatment arrangement in the controlling unit 150. The controlling unit 150 may output an instruction or an activation/deactivation signal or even a grade of activation which is then delivered to a treatment control interface 160. It should be noted, that the controlling device 100 may be provided remote from a treatment device and may also be provided remote from a database 90. Even if the treatment device is provided with image capturing devices 120, 130, 140, these images or image data may be transferred to the remote control device 100 and may be received by the image interface 110 of the controlling device 100. The instruction signal or activation/deactivation signal then will be issued via the treatment control interface 160 and will be transferred to the treatment device which may be a sprayer with a plurality of nozzles 61, 62, 63. It should be noted, that the controlling device may be located elsewhere and that the data transfer of the image data as well as the data transfer of the activation/deactivation signal may be carried out over wide distances. The same applies to the transfer of the sample data of the database 90, which also may be located elsewhere.

Figure 7:
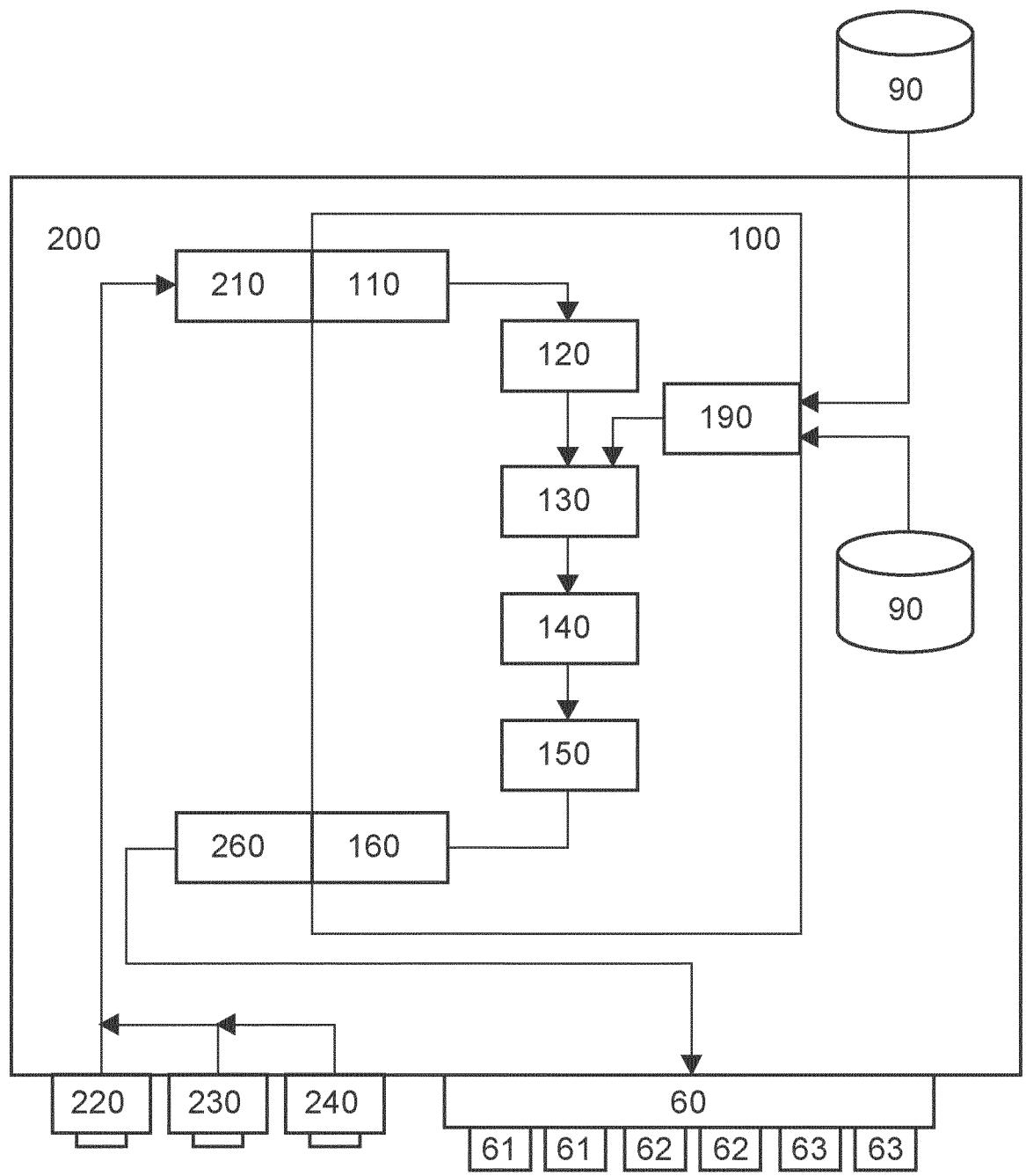
FIG. 7 illustrates a treatment device according to an exemplary embodiment of the invention.

FIG. 7 illustrates a treatment device 200 having implemented a controlling device 100. It should be understood, that although FIG. 7 illustrates the controlling device 100 as part of the treatment device, the controlling device may be remotely positioned with respect to the treatment device 200. In this case, the communication between the interface 110, 160 of the controlling device 100 to the respective counter-interfaces 210, 260 of the treatment device 200 may take place via wireless communication over wide distances. Database 90 may be provided within the treatment device 200 but also may be located remotely from the treatment device 200 which is illustrated by the two alternatives of the database in FIG. 7. It should be noted, that a smaller database may be provided within the treatment device 200, whereas a more complex database 90 may be provided remote thereof. It should be noted, that it is easier to provide a complex database at a central position so that even other treatment devices may have access to the database 90, which is more difficult when providing the database only within the treatment device 200. The details of the controlling device 100 are described with respect to FIG. 6 and apply accordingly. The image capturing devices 220, 230, 240 are illustrated and described with respect to FIG. 5 which applies accordingly. The captured image will be provided via the image interface 210 of the treatment device 200 to the image interface 110 of the controlling device. After having carried out the method within the controlling device 100, an instruction or activation/deactivation signal or activation grade is provided to the treatment control interface 160, which will transfer the respective instruction/data via the treatment control interface 260 of the treatment device 200 to a treatment arrangement 60. The treatment arrangement 60 may be divided into respective treatment units 61, 62, 63 the application of which is illustrated with respect to FIG. 5.

It should be noted, that although the several steps and portions of the method are described in consecutive order with respect to FIG. 1, also a different sequence or parallel processing may take place, in particular if the method runs in a loop, so that for example identifying or determining S30, S40 may be carried out in parallel to a recognizing S20 of a subsequent loop of the method. It should also be understood, that the decision making which is described with respect to FIGS. 2 and 3 is not limited to a consecutive decision of one question after the other with respect to threshold tp and another question with respect to threshold tb as illustrated in FIG. 2 and FIG. 3. In case, the decision will be based on a look-up table, there will be provided a correlated relation between the quantity of pest insects and beneficial insects so as to arrive at an activation grade. The same applies to the different thresholds for different types of pest insects according to FIG. 3 and although not illustrated to different types of beneficial insects. It should be noted, that the number of patterns and different types of identifiers with respect to FIG. 4 are not limited to the illustrated ones.

REFERENCE LIST 10 image
20 (recognized) item on image
21 shape of a particular type of insect
22 optical or motion spectral signature of a particular type of insect
31 pattern of single first type of pest insect/potato beetle
32 pattern of agglomeration of first type of pest insects/potato beetles
33 pattern of single second type of pest insect/pollen beetle
34 pattern of agglomeration of second type of pest insect/pollen beetles
35 pattern of combination of a single/agglomeration of first and second type of pest insects
36 pattern of single beneficial insect/bee
37 pattern of agglomeration of beneficial insects/bees
38 pattern of combination of pest insects and beneficial insects
39 pattern of combination of pest insects and beneficial insects
60 treatment arrangement, nozzle arrangement
61 treatment unit, nozzle
62 treatment unit, nozzle
63 treatment unit, nozzle
90 database
100 controlling device
110 image interface of controlling device
120 image recognition unit
130 identification unit
140 determination/evaluation unit
150 controlling unit
160 treatment control interface
190 database interface
200 treatment device, sprayer, smart sprayer
210 image interface of treatment device
220 image capture device, 1st camera/scanner
230 image capture device, 2nd camera/scanner
240 image capture device, 3rd camera/scanner
260 treatment control interface
300 plantation field, crop field
310 predetermined range of plantation field
320 predetermined range of plantation field
330 predetermined range of plantation field
931 sample of single first type of pest insect/potato beetle
932 sample of agglomeration of first type of pest insects/potato beetles
933 sample of single second type of pest insect/pollen beetle
934 sample of agglomeration of second type of pest insect/pollen beetles
935 sample of combination of a single/agglomeration of first and second type of pest insects
936 sample of single beneficial insect/bee
937 sample of agglomeration of beneficial insects/bees
938 sample of combination of pest insects and beneficial insects
939 sample of combination of pest insects and beneficial insects
S10 taking image
S20 recognizing items
S30 identifying patterns
S40 determining measure of a quantity of insect population
S41 determining a quantity of a particular type of pest insects
S50 controlling treatment arrangement
S60 activation of a treatment unit
tp predetermined threshold for pest insects
tp1 predetermined threshold for $1^{st}$ type of pest insects
tp2 predetermined threshold for $2^{nd}$ type of pest insects
tb predetermined threshold for beneficial insects

The invention claimed is:

1. A method for pest treatment of a plantation field, the method comprising:
taking (S10) an image (10) from a predetermined range (310) of a plantation of the plantation field (300);
recognizing (S20) items (20) on the taken image (10) of the predetermined range;
identifying (S30) one or a plurality of patterns (31, 32, . . . 39) of an insect population based on the recognized items and a database (90) having stored samples of an insect population (931, 932, . . . 939);
determining (S40) a measure of a quantity of insect population based on the identified patterns; and
controlling (S50) a treatment arrangement (60) of a treatment device (200) based on the determined quantity of insect population,
wherein controlling (S50) of a treatment arrangement (60) includes activating (S60) a treatment unit (61, 62, 63) if a quantity of a first type (931, 932) and/or a second type (933, 934) of pest insects extends a predetermined threshold (tp), and blocking a treatment unit (61, 62, 63) from being activated if a quantity of a particular type of beneficial insects (936, 937) extends a predetermined threshold (tb).

2. The method according to claim 1, wherein controlling (S50) of a treatment arrangement (60) is conducted based on a lookup table having stored a relation of a quantity of pest insect population and a quantity of beneficial insect population and a respective quantitative activation grade for a treatment unit (61, 62, 63) being allocated to a respective relation.

3. The method according to claim 1, wherein recognizing (S20) items (20) on a taken image (10) is conducted based on a spectral detection of at least one pixel, in particular a red-green-near infrared RGNIR detection of at least one pixel, wherein a pattern (31, 32, . . . 39) is based on a location of the at least one detected pixel in a color space, in particular an RGNIR color space.

4. The method according to claim 1, wherein identifying (S30) one or a plurality of patterns (31, 32, . . . 39) of an insect population is based on an algorithm fed by stored samples of an insect population (931, 932, . . . 939) of the database (90).

5. The method according to claim 1, wherein an identified pattern (31, 32, . . . 39) of an insect population is stored as a sample of an insect population (931, 932, . . . 939) in the database (90).

6. The method according to claim 1, wherein recognizing (S10) items (20) is conducted on a plurality of predetermined ranges (310, 320, 330) simultaneously, wherein identifying (S30) one or a plurality of patterns (31, 32, . . . 39) of an insect population is conducted on the plurality of predetermined ranges, respectively, wherein determining (S40) a measure of a quantity of insect population is conducted on the plurality of predetermined ranges, respectively, wherein controlling (S50) a treatment arrangement (60) of a treatment device (200) is conducted for one or a plurality of treatment units (61, 62, 63) being allocated to a respective one of the plurality of predetermined ranges (310, 320, 330).

7. The method according to claim 1, wherein recognizing (S20) items (20) on the image (10) includes at least one of a recognition of a shape (21), a wing beat frequency and spectral signature (22) of a particular type of insect, in particular in an RGNIR color space of a particular type of insect.

8. The method according to claim 1, wherein the stored samples (931, 932, . . . 939) represent a single pest insect (931, 933) or an agglomeration of a plurality of pest insects (932, 934), in particular a single or an agglomeration of a plurality of potato beetles (931, 932), a single or an agglomeration of a plurality of pollen beetles (933, 934) or a combination thereof (935), and/or the stored samples represent a single beneficial insect (936) or an agglomeration of a plurality of beneficial insects (937), in particular a single or an agglomeration of a plurality of bees.

9. The method according to claim 1, wherein the stored samples represent combination (938, 939) of
a single or an agglomeration of a plurality of pest insects, in particular a single or an agglomeration of a plurality of potato beetles, and/or a single or an agglomeration of a plurality of pollen beetles, and
a single or an agglomeration of a plurality of beneficial insects, in particular a single or an agglomeration of a plurality of bees.

10. The method according to claim 1, wherein determining (S40) a measure of a quantity of insect population includes determining (S41) at least one of a quantity of a particular first type of pest insects (931, 932), in particular potato beetles, a quantity of a particular second type of pest insects (933, 934), in particular pollen beetles, and/or a quantity of a particular third type of beneficial insects (936, 937), in particular bees.

11. The method according to claim 1, wherein determining (S40) includes online determination of a measure of a quantity of insect population based on the identified patterns, wherein in particular during field passage images and/or scans are captured, information is collected and a localized application according to the imaged and/or scanned item is carried out; wherein image capture and/or scan capture is timed such that it correlates with the speed during passage.

12. A controlling device for a treatment device, in particular a smart sprayer (200) for pest treatment of a plantation field (300), the controlling device comprising:
an image interface (110);
a treatment control interface (160);
a database interface (190);
an image recognition unit (120) being adapted for recognizing items (20) on an image (10) received from the image interface;
an identification unit (130) being adapted for identifying one or a plurality of patterns (31, 32, . . . 39) of an insect population based on the output of the image recognition unit and samples (931, 932, . . . 939) of an insect population being received from a database (90) having stored samples (931, 932, . . . 939) of a pest population via the database interface (190);
a determination unit (140) being adapted for determining a measure of a quantity of insect population based on the identified patterns (31, 32, . . . 39); and
a controlling unit (150) being adapted for generating a controlling signal for a treatment arrangement (60) of a treatment device (200) based on the determined measure of a quantity of insect population and for outputting the controlling signal to the treatment control interface (160),
wherein the controlling unit (150) being adapted for generating an activating signal for a treatment unit (61, 62, 63) if a quantity of a first type (931, 932) and/or a second type (933, 934) of pest insects extends a predetermined threshold (tp), and generating a blocking signal for deactivating a treatment unit (61, 62, 63) if a quantity of a particular type of beneficial insects (936, 937) extends a predetermined threshold (tb).

13. The controlling device according to claim 12, wherein the image recognition unit (120) is adapted for conducting an item recognition on a plurality of predetermined ranges (310, 320, 330) simultaneously, wherein the identification unit (130) is adapted for identifying one or a plurality of patterns (31, 32, . . . 39) of an insect population on the plurality of predetermined ranges, respectively, wherein the determination unit (140) is adapted for determining a measure of a quantity of insect population on the plurality of predetermined ranges, respectively, wherein the controlling unit (150) is adapted for controlling a treatment arrangement (60) of a treatment device (200) for one or a plurality of treatment units (61, 62, 63) being allocated to a respective one of the plurality of predetermined ranges (310, 320, 330).

14. A treatment device for pest treatment of a plantation field (300) comprising:
an image capture device (220) being adapted for taking an image (10) from a predetermined range (310) of a plantation of a plantation field (300);
a treatment arrangement (60) having one or a plurality of treatment units (61, 62, 63);
an image interface (210) being adapted for providing an image (10) captured by the image capture device (220) to a controlling device (100) according to claim 12; and
a treatment control interface (260) being adapted for receiving a treatment control signal from the controlling device (100);
wherein the image interface (210) of the treatment device (200) is connectable to an image interface (110) of the controlling device (100),
wherein the treatment control interface (260) of the treatment device (200) is connectable to a treatment control interface (160) of the controlling device (100), and
wherein the treatment device (200) is adapted to activate respective ones of treatment units (61, 62, 63) of the treatment arrangement (60) based on a signal received from the controlling device (100) via the treatment control interface (260) of the treatment device (200).

15. The treatment device according to claim 14, wherein the image capture device (220) comprises one or a plurality of cameras (220, 230, 240), in particular on a boom of the treatment device (200), wherein the image recognition unit (120) is adapted for recognizing insects and/or plantation using red-green-blue RGB data and/or near infrared NIR data.

16. The treatment device according to claim 14, wherein the treatment device (200) is designed as a smart sprayer, wherein the treatment arrangement is a nozzle arrangement (60), wherein the treatment unit or units are a nozzle or nozzles (61, 62, 63).

* * * * *